United States Patent [19]

Yamanashi

[11] Patent Number: 5,002,373
[45] Date of Patent: Mar. 26, 1991

[54] ZOOM LENS SYSTEM OF INNER FOCUS TYPE

[75] Inventor: Takanori Yamanashi, Tokyo, Japan

[73] Assignee: Olympus Optical Co., Ltd., Tokyo, Japan

[21] Appl. No.: 307,929

[22] Filed: Feb. 9, 1989

[30] Foreign Application Priority Data

Feb. 10, 1988 [JP] Japan .................................. 63-27547

[51] Int. Cl.⁵ .............................................. G02B 15/14
[52] U.S. Cl. .................................................... 350/427
[58] Field of Search ............................... 350/423, 427

[56] References Cited

U.S. PATENT DOCUMENTS

| | | | |
|---|---|---|---|
| 4,571,032 | 2/1986 | Someya et al. | 350/427 |
| 4,634,236 | 1/1987 | Masumoto | 350/423 X |
| 4,636,040 | 1/1987 | Tokumaru | 350/427 |
| 4,650,291 | 3/1987 | Kato | 350/427 |
| 4,666,257 | 5/1987 | Tanaka et al. | 350/427 |
| 4,684,223 | 8/1987 | Ikemori et al. | 350/423 |
| 4,730,906 | 4/1988 | Okudaira | 350/426 |
| 4,776,680 | 10/1988 | Tanaka | 350/427 |
| 4,842,385 | 6/1989 | Tanaka | 350/427 |

FOREIGN PATENT DOCUMENTS

| | | |
|---|---|---|
| 56-128911 | 10/1981 | Japan . |
| 57-201213 | 12/1982 | Japan . |
| 58-137813 | 8/1983 | Japan . |
| 58-184916 | 10/1983 | Japan . |
| 60-55314 | 3/1985 | Japan . |
| 60-57814 | 4/1985 | Japan . |
| 61-148414 | 7/1986 | Japan . |

Primary Examiner—Scott J. Sugarman
Attorney, Agent, or Firm—Cushman, Darby & Cushman

[57] ABSTRACT

A zoom lens system of inner focus type including a first lens group having positive refractive power, a second lens group having positive refractive power and a third lens group having negative refractive power. The zoom lens system is so designed as to perform focusing by shifting the second or third lens group for a short distance along the optical axis and to minimize variation of aberrations caused due to focusing.

4 Claims, 17 Drawing Sheets

FIG. 1A
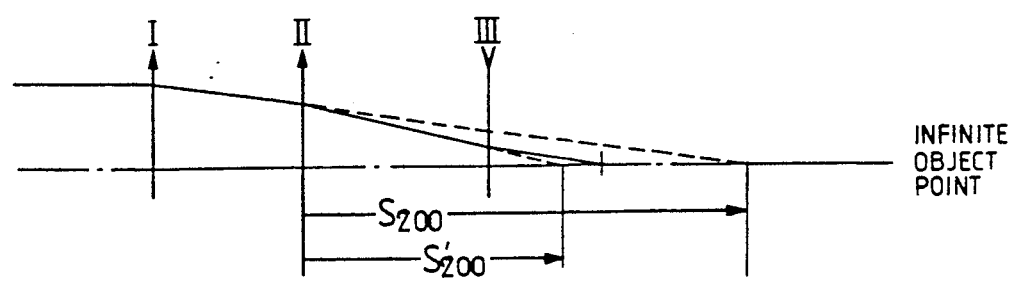
INFINITE OBJECT POINT
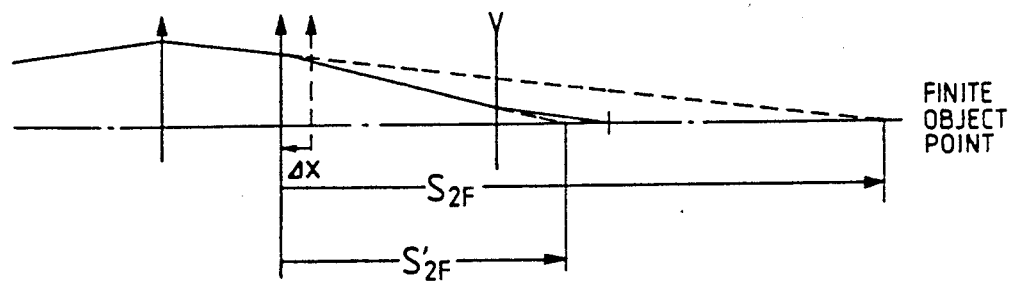
FINITE OBJECT POINT
FIG. 1B

WIDE POSITION

INTER-
MEDIATE
FOCAL
LENGTH

TELE POSITION

WIDE POSITION

FOCUSING

INTER-MEDIATE FOCAL LENGTH

TELE POSITION

WIDE POSITION

FOCUSING

INTER-MEDIATE FOCAL LENGTH

TELE POSITION

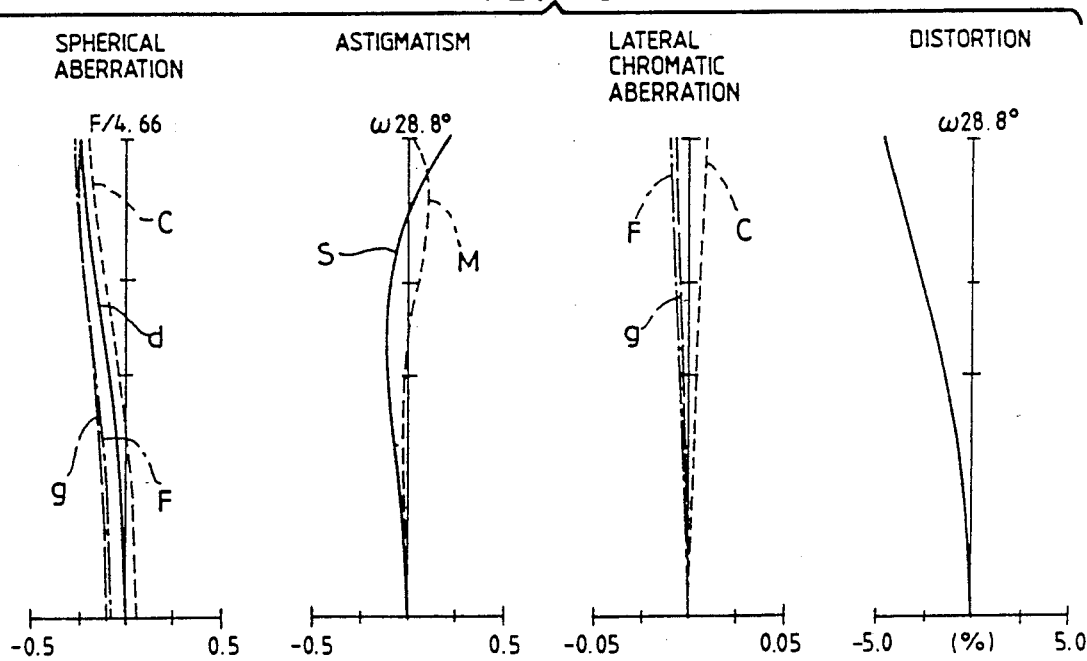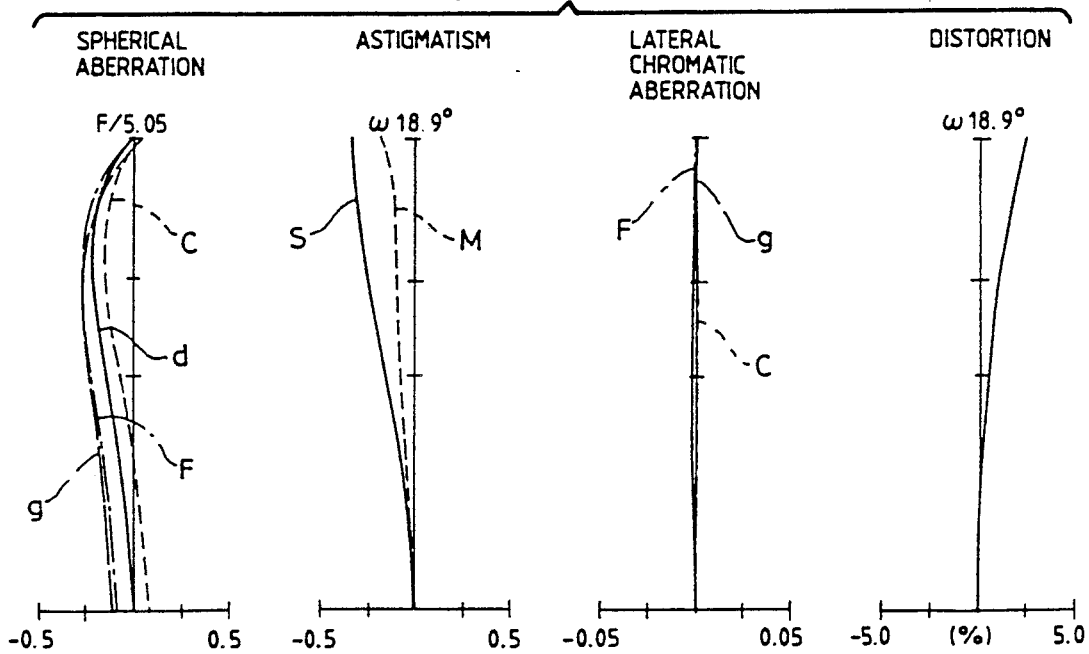

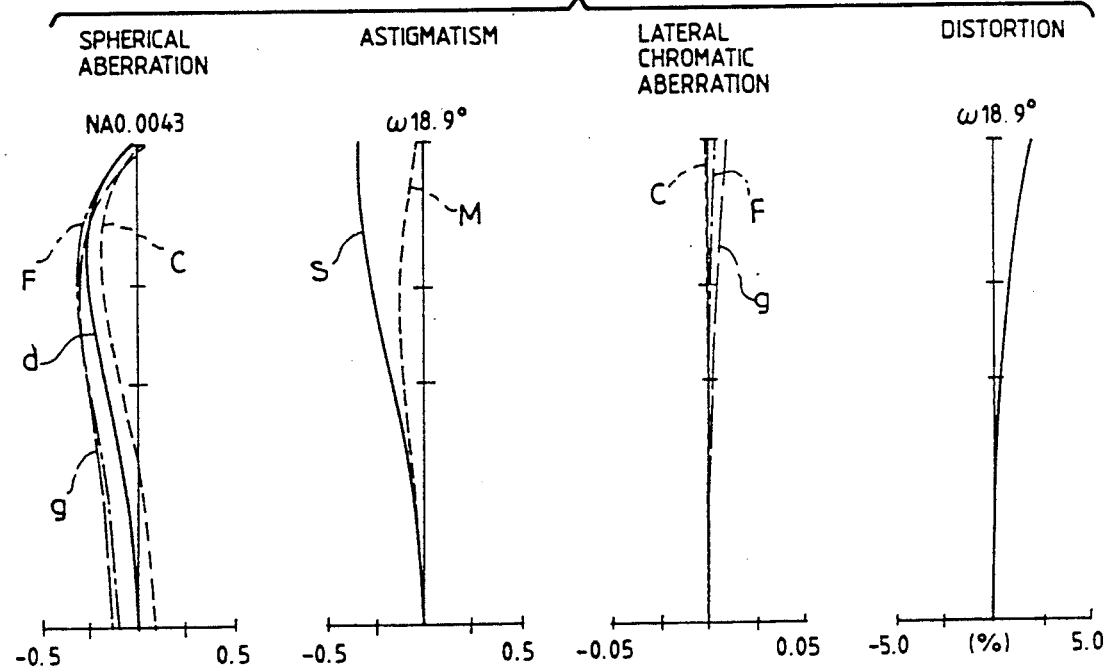
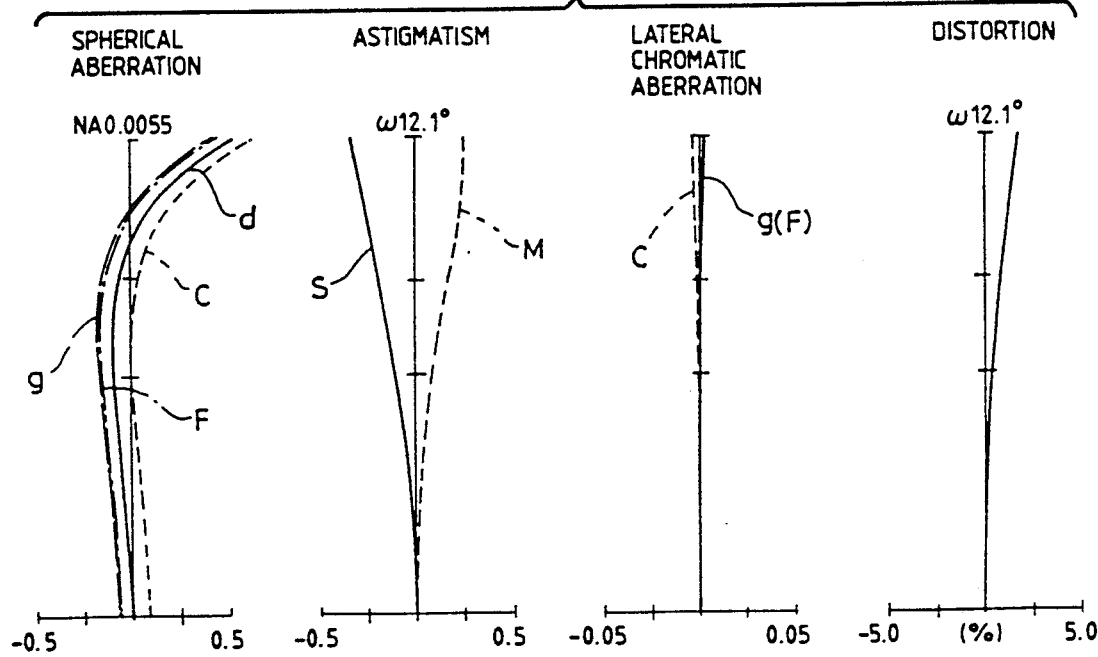

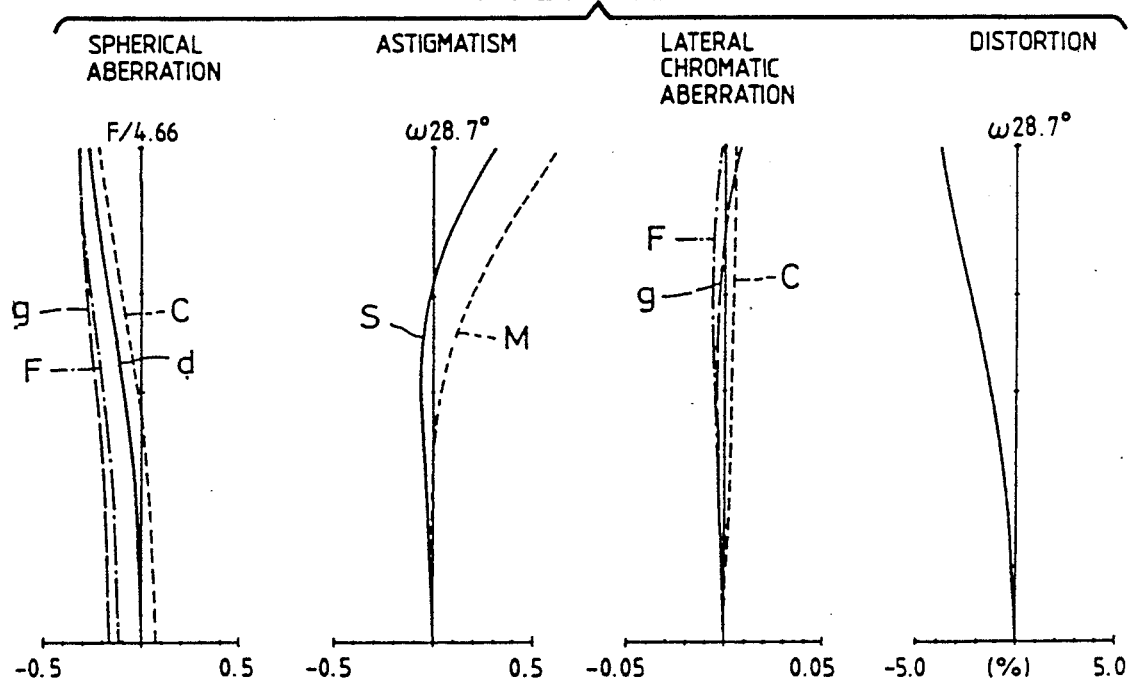
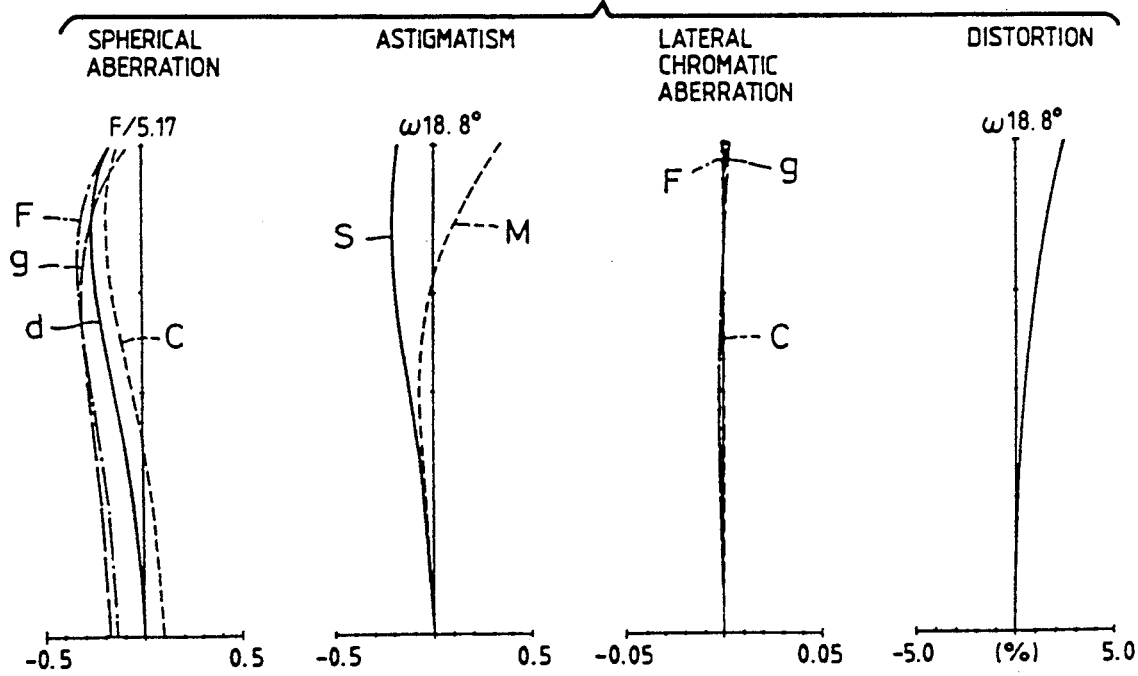

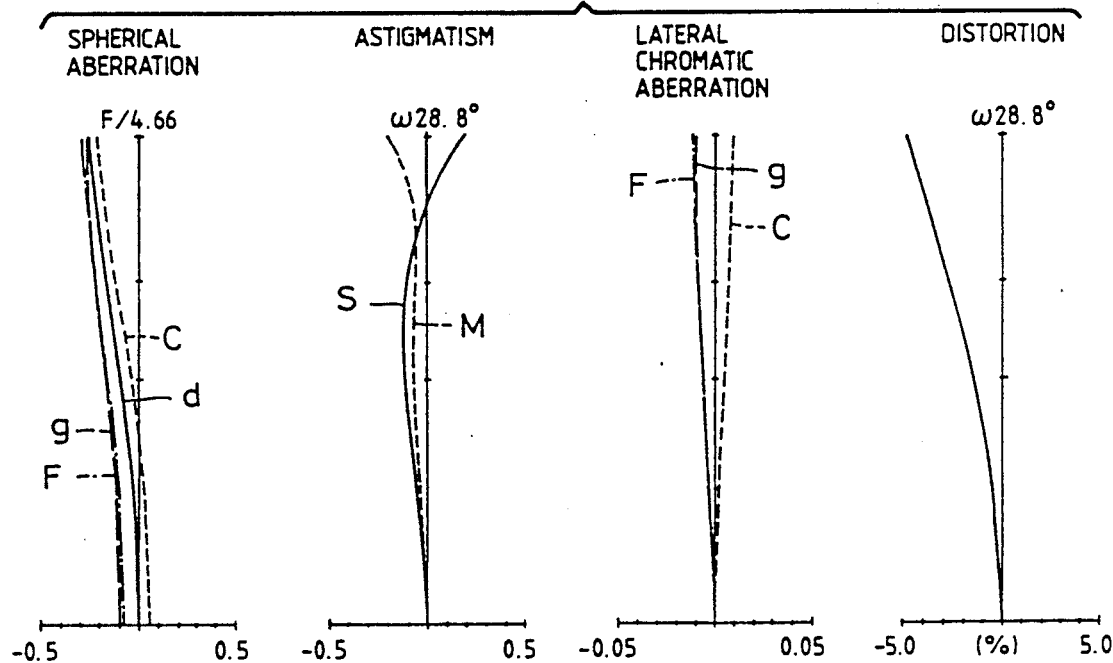
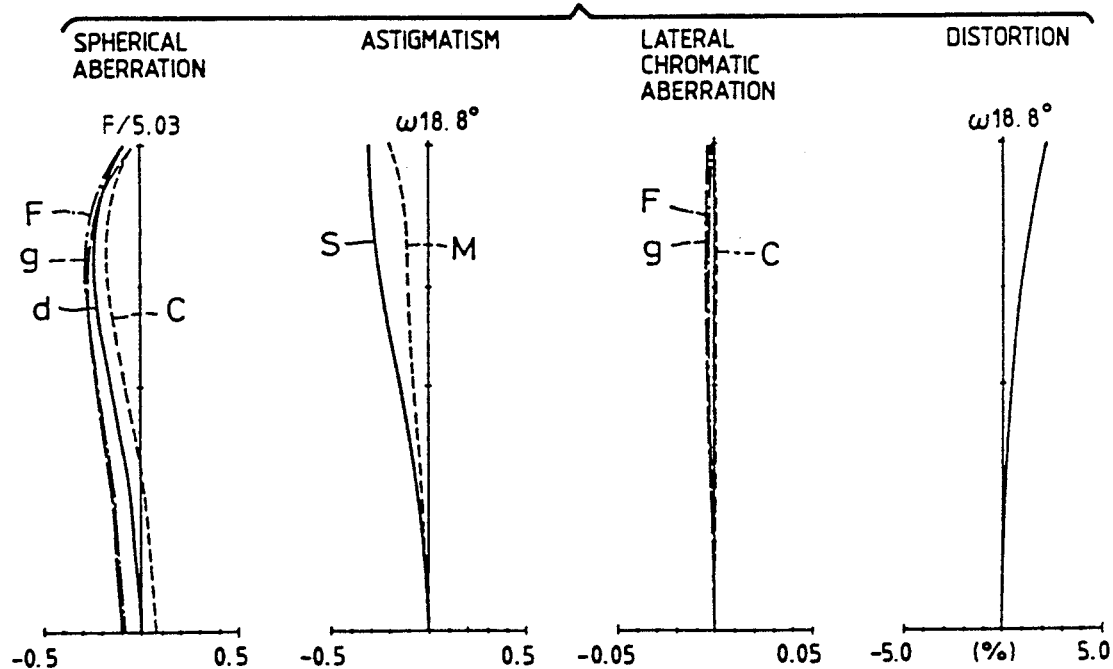

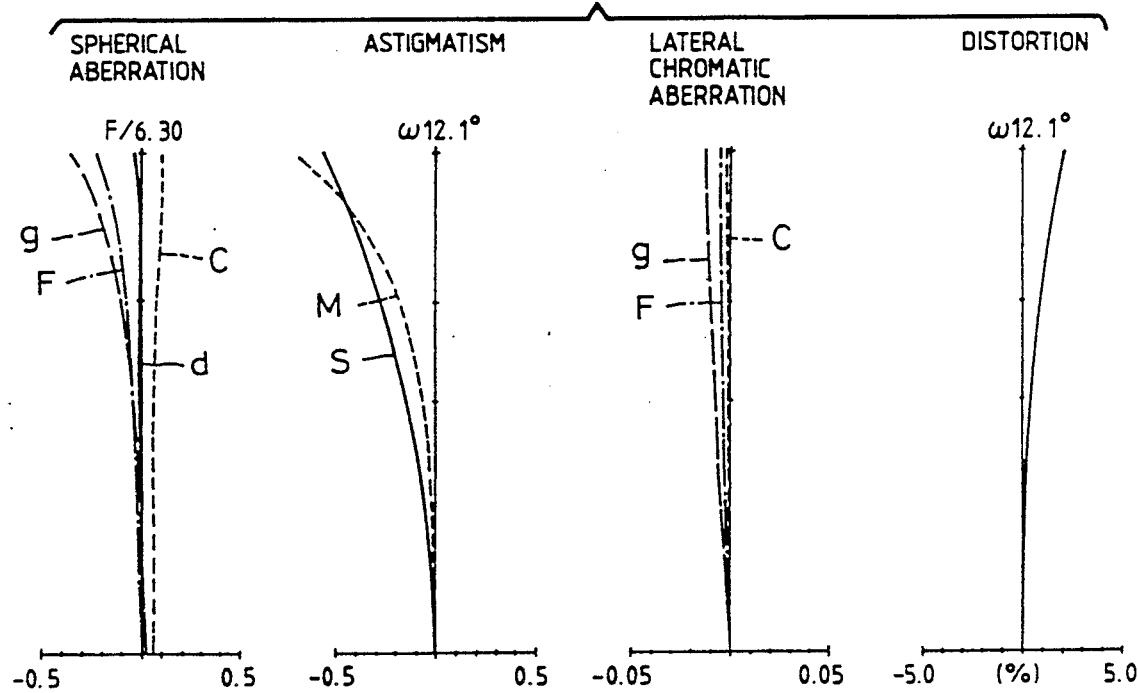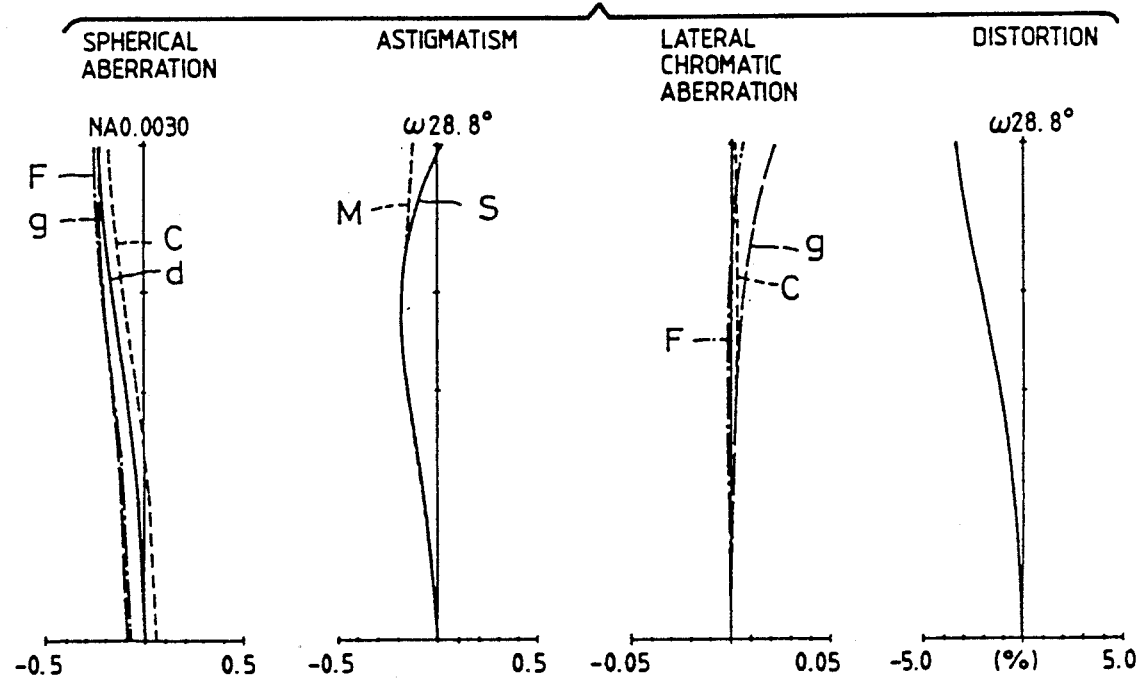

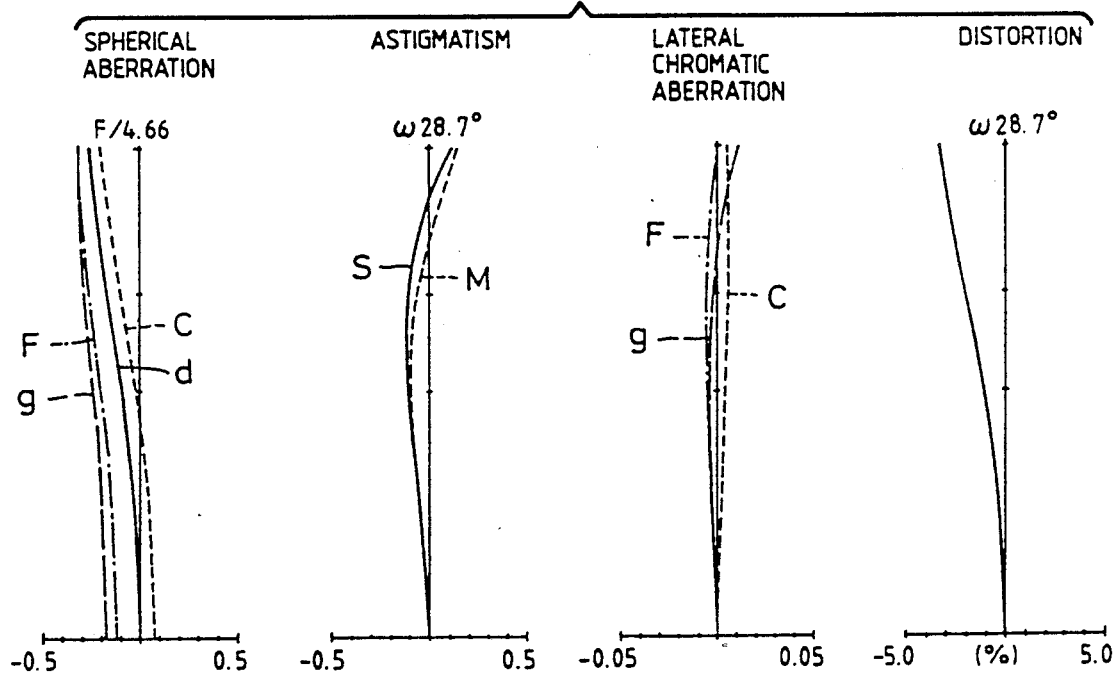
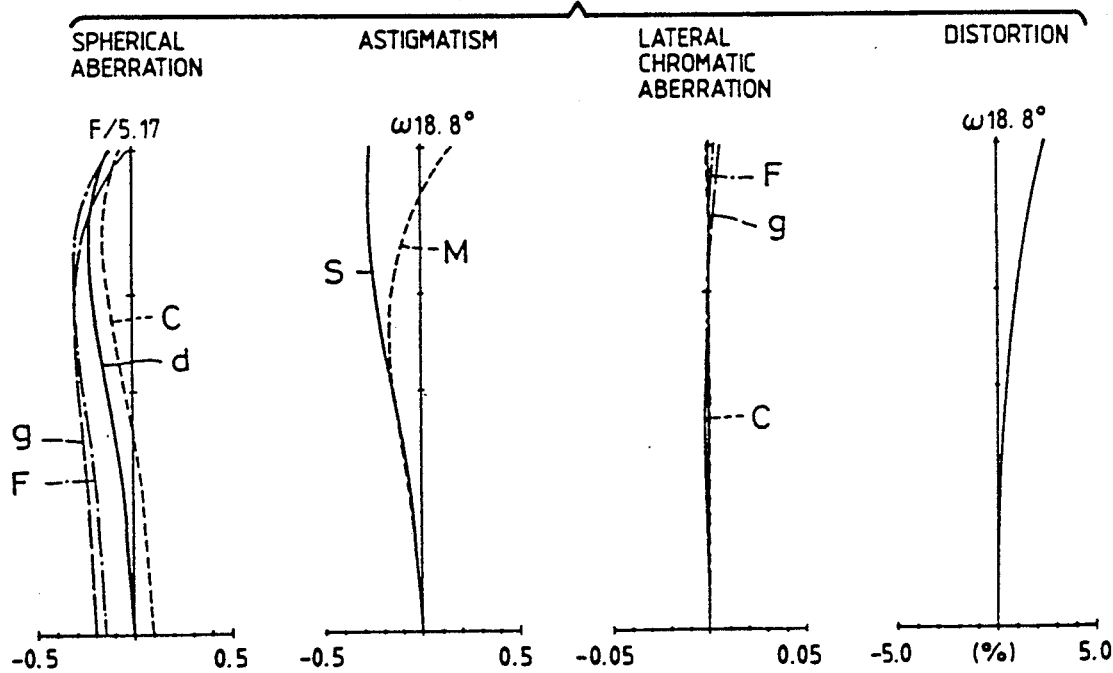

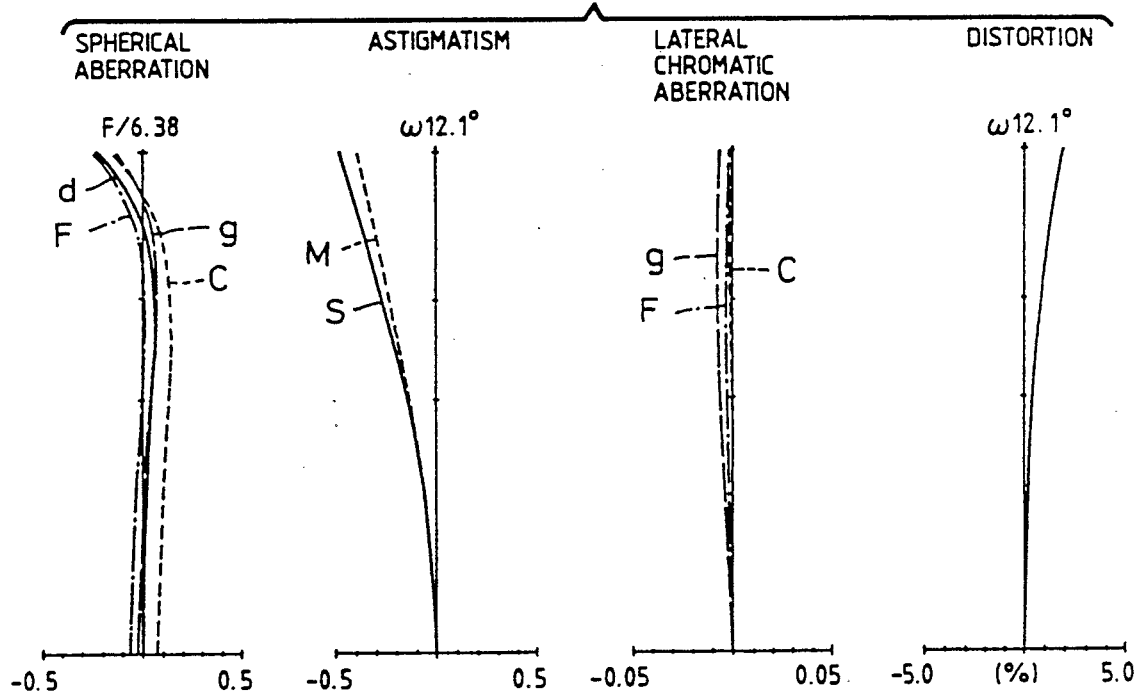
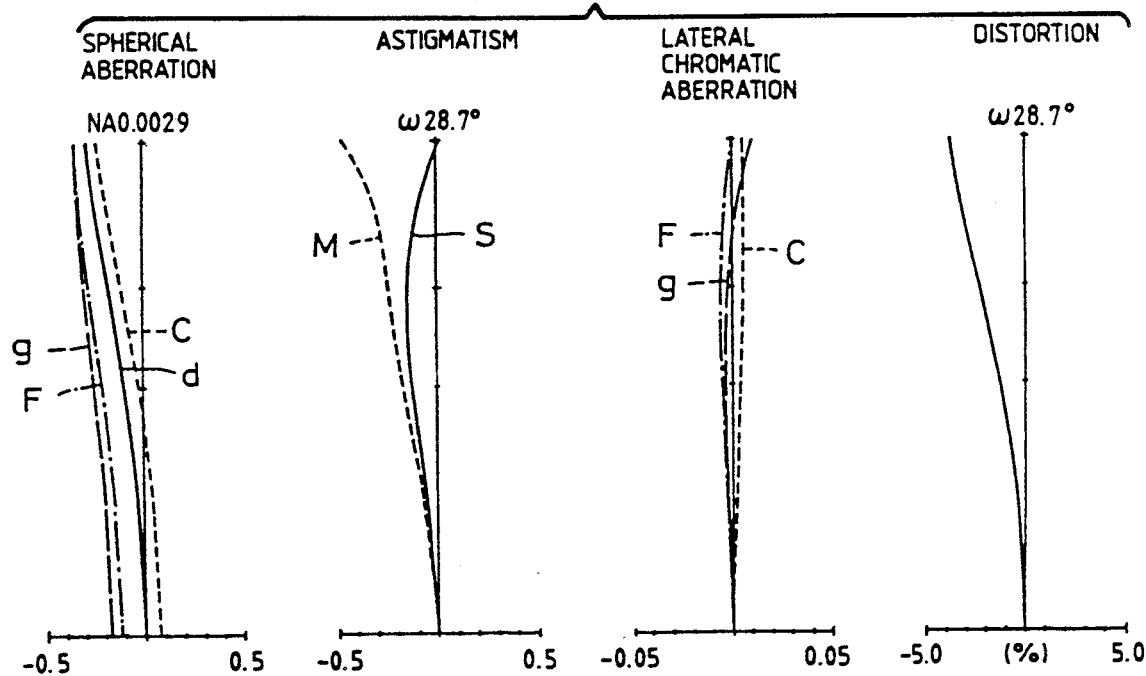

ZOOM LENS SYSTEM OF INNER FOCUS TYPE

BACKGROUND OF THE INVENTION

1. Field of the invention

The present invention relates to a compact zoom lens system of inner focus type consisting of three lens groups.

2. Description of the prior art

In the recent years where cameras are increasingly fully automated, lens systems permitting variations of focal lengths are adopted also as photographic lens systems for the so-called lens shutter cameras featuring portability. This trend has produced necessity to develop compact zoom lens systems.

It is possible to make compact the lens systems to be used in the lens shutter cameras by shortening back focal lengths since the lens systems for the lens shutter cameras are, unlike the lens systems for single lens reflex cameras, free from the restriction that definite back focal lengths must be reserved.

On the other hand, it is necessary to take into consideration, for designing compact lens systems for the lens shutter cameras, not only shortening of total lengths of the lens systems and minimization of diameters but also the relationship with the shutter mechanisms serving also as stops arranged in the lens barrels and the driving systems including the focusing mechanisms for automatic focusing which are arranged in the lens shutter cameras. Speaking concretely, the conventional lens system having a fixed focal length for use mainly at a wide angle, the lens system having switchable focal lengths and the zoom lens system having a low vari-focal ratio pose no problem since these lens systems can be made compact even when focusing is performed by shifting the lens system as a whole or the first lens group thereof. However, in case of the zoom lens system having a high vari-focal ratio, it comprises multiple lens groups and produces the defect described below when the first lens group is shifted for focusing:

The first lens group generally has a large diameter and must have refractive power weaker that those of the lens groups arranged thereafter for stabilizing the optical performance thereof, i.e., for minimizing variation of aberrations caused due to focusing. A first lens group having weaker refractive power inevitably increases shift distance for focusing even on an object located at the same distance. Accordingly, the shortest object distance allowed by the lens system is prolonged and the load imposed on the focusing motor arranged in the automatic focusing mechanism is increased, thereby increasing power consumption. Further, since the first lens group is located on the extremely object side in the lens barrel, it is difficult to control the first lens group directly from the side of the camera body, thereby making it necessary to use a driving motor for focusing independently of a shutter driving motor, and producing serious defects from the viewpoints of compactness and light weight of cameras as well as acceleration of focusing speed.

SUMMARY OF THE INVENTION

A primary object of the present invention is to provide a zoom lens system of inner focus type which can be focused with a short shift distance, allows aberrations to be varied very little by focusing and suited for use in compact cameras, more particularly in cameras equipped with automatic focusing mechanisms.

The zoom lens system according to the present invention comprises, in the order from the object side, a first lens group having positive refractive power, a second lens group having positive refractive power and a third lens group having negative refractive power, so designed as to perform variation of focal length by varying the airspaces reserved between adjacent lens groups, and so adapted as to perform focusing by shifting, along the optical axis, a lens group arranged on the image side of the first lens group while varing the airspaces reserved between said lens group and each of the neighboring lens groups.

In the zoom lens system which consists of three lens groups as shown in FIG. 2, for example, the second lens group has a small outside diameter and a light weight. It is therefore possible to shorten the shift distance for focusing and enhance focusing speed by selecting the second lens group as the one to be shifted for focusing.

When focusing is performed by shifting the first or second lens group other than the third lens group along the optical axis as described above, there is posed a problem that variation of focal length of the zoom lens system as a whole results in variation of the shift distance for focusing even on an object located at the same distance. This problem can be solved by using a plural number of focusing cams which correspond to lens shift distances at respective focal lengths of the zoom lens system as a whole, but it is difficult to control the shifting of the lens group with a plural number of cams.

For this reason, there has been proposed a focusing method which approximates the plural number of the focusing cams into a single cam by the least square method and performs focusing by using different sections of the cam depending on variation of focal length, thereby limiting shift of focal point within the depth of field. However, this method must be carried out by using mechanical means and requires interlocking the zooming cam with said focusing cam, thereby making the lens barrel structure very complicated.

Further, there has been proposed another method, for focusing a zoom lens system by shifting a lens group other than the first lens group, to select refractive power distribution so as to keep lens shift distance for focusing nearly constant in spite of variation of focal length of the zoom lens system as a whole and to locate within a depth of field all the image points of objects located within a range from infinite to short distance. This method permits control of the shifting lens group by the same means as that for shifting the first lens group. However, due to the restriction imposed on refractive power distribution, this method has defects that thin lens components must be prepared in accordance with the restricted refractive power distribution and that flexibility for correction of aberrations is lowered accordingly. Therefore, it is impossible to apply this focusing method to all types of lens systems.

The present invention makes it possible to select an optional lens group as a movable lens group for focusing and correct aberrations freely from the restriction to a specific refractive power distribution.

The focusing mechanism to be used in combination with the zoom lens system according to the present invention is based on a fundamental concept that a lens group is to be shifted for a focusing distance corresponding to a focal length of the zoom lens system as a whole after measuring a distance to an object to be photographed. The lens shift distance for focusing is determined by a combination of a value given as a function of an inverse number of an object distance and a shift distance of an optimum image plane at a finite distance, which are preliminarily stored in a memory device such as ROM (Read Only Memory). Focusing is performed by reading out a shift distance for focusing corresponding to a distance to an object to be photographed after measuring the distance to the object, and shifting the movable lens group for the distance.

FIG. 1 exemplifies arrangement of the lens groups determined by the paraxial theory when a zoom lens system consisting of three lens groups, like the zoom lens system according to the present invention, is focused on object located at infinite distance and a finite distance respectively by the second lens group. From this drawing, the relationship between the object point and the image point taking the second lens group II as standard is expressed by the following formulae:

$$S_{2\infty} = f_2(1 - 1/\beta_{2\infty}) \quad (i)$$

$$S'_{2\infty} = f_2(1 - \beta_{2\infty}) \quad (ii)$$

$$S_{2F} = f_2(1 - 1/\beta_{2F}) \quad (iii)$$

$$S'_{2F} = f_2(1 - \beta_{2F}) \quad (iv)$$

wherein the reference symbols $\beta_{2\infty}$ and $\beta_{2F}$ represent magnifications for object points located at infinite distance and a finite distance respectively.

On the basis of these formulae, shift distance $\Delta x$ for focusing is expressed by the following equation:

$$\Delta = f_2(\beta_{2\infty} - \beta_{2F}) \quad (v)$$

When the lateral magnification to be shared by the focusing lens group is determined from the relationship between the object point and the image point of the focusing lens group (the second lens group in this example) which in turn is determined by refractive power distribution, it is therefore possible to calculate the shift distance $\Delta x$ for focusing by the equation (v).

Since the shift distance $\Delta x$ for focusing is variable, even for a definite object distance, depending on focal length of the zoom lens system as a whole, the control to set the image position of an object located at finite distance within a depth of field is performed by preliminarily storing relationship between shift distance for focusing and object distance in a memory device, making access to the storage element from a control system in a camera body with control signals as occasion demands and transmitting the data to a driving system.

As is understood from the above-mentioned equation (v), shift distance for focusing is determined by focal length of the focusing lens group (the second lens group in the above-described example) and paraxial lateral magnification for a specific object distance, and shift distance for focusing is shorter as a focusing lens group has a shorter focal length.

For cameras comprising a compact zoom lens system and equipped with an automatic focusing mechanism, it is very important that a focusing lens group is light in weight and shifted for a short distance for focusing.

Though the lens group is shifted as a whole in the foregoing description, the above-described merit can be obtained by shifting one or some of lens component(s) along the optical axis for focusing when the second or the third lens group consists of a plural number of lens components. The present invention covers also zoom lens systems of such types.

BRIEF DESCRIPTION OF THE DRAWINGS

FIG. 1 shows a sectional diagram illustrating the principle of the focusing method for the zoom lens system according to the present invention;

FIG. 6 through FIG. 11 show curves illustrating aberration characteristics of the lens system preferred as the Embodiment 1 of the present invention;

FIG. 12 through FIG. 17 show curves illustrating aberration characteristics of the lens system preferred as the Embodiment 2 of the present invention;

FIG. 18 through FIG. 23 show graphs illustrating aberration characteristics of the lens system preferred as the Embodiment 3 of the present invention; and FIG. 24 through FIG. 29 show graphs illustrating aberration characteristics of the lens sysem preferred as the Embodiment 4 of the present invention.

DETAILED DESCRIPTION OF THE PREFERRED EMBODIMENTS

Now, the preferred Embodiments of the present invention will be described detailedly with reference to the accompanying drawings.

Figure 2A:
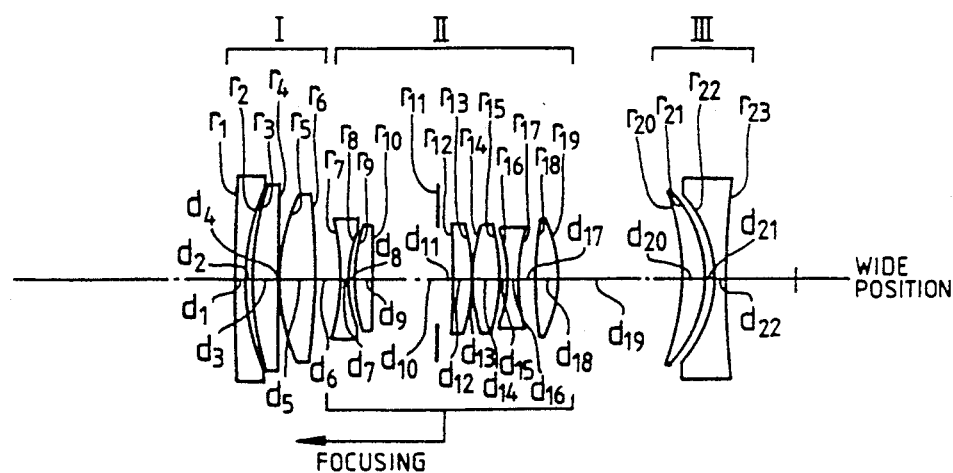
FIG. 2 through FIG. 5 show sectional views illustrating compositions of Embodiments 1 through 4 of the zoom lens system according to the present invention.
Figure 2B:
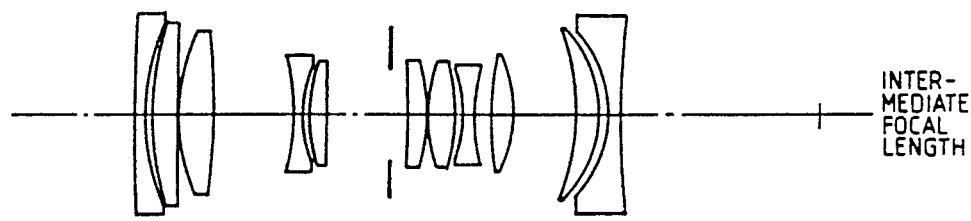
Figure 2C:
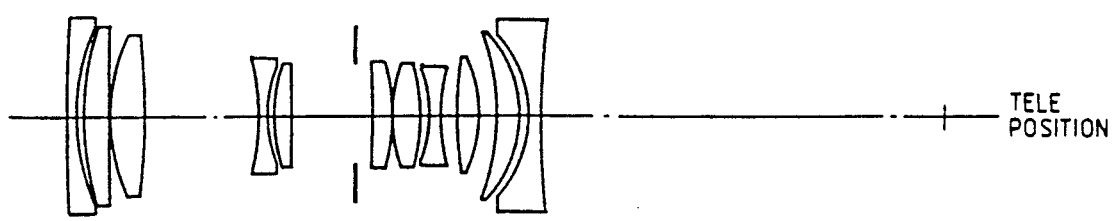

FIG. 2 illustrates composition 1 of the Embodiment 1 of the present invention which is so adapted as to perform focusing by the above-described focusing method.

The zoom lens system preferred as the Embodiment 1 of the present invention has the numerical data listed below:

| f = 39.4–101.0, F/4.62–F/6.38 |
| 2ω = 57.6°–24.2° |

| | | | |
|---|---|---|---|
| $r_1 = 349.7273$ | | | |
| | $d_1 = 1.5000$ | $n_1 = 1.83687$ | $\nu_1 = 37.16$ |
| $r_2 = 32.5385$ | | | |
| | $d_2 = 1.1000$ | | |
| $r_3 = 43.1840$ | | | |
| | $d_3 = 3.4800$ | $n_2 = 1.61827$ | $\nu_2 = 62.79$ |
| $r_4 = 357.2278$ | | | |
| | $d_4 = 0.2000$ | | |
| $r_5 = 27.9438$ | | | |
| | $d_5 = 5.2000$ | $n_3 = 1.51737$ | $\nu_3 = 64.15$ |
| $r_6 = -95.9410$ | | | |
| | $d_6 = D_1$ (variable) | | |
| $r_7 = -33.4809$ | | | |
| | $d_7 = 1.3000$ | $n_4 = 1.77450$ | $\nu_4 = 49.66$ |
| $r_8 = 21.5300$ | | | |
| | $d_8 = 0.8000$ | | |
| $r_9 = 26.1781$ | | | |
| | $d_9 = 2.5100$ | $n_5 = 1.80918$ | $\nu_5 = 25.43$ |
| $r_{10} = -858.4002$ | | | |
| | $d_{10} = 8.2359$ | | |
| $r_{11} = \infty$ (stop) | | | |
| | $d_{11} = 3.5000$ | | |
| $r_{12} = -138.7143$ | | | |
| | $d_{12} = 2.8000$ | $n_6 = 1.62222$ | $\nu_6 = 36.25$ |
| $r_{13} = -29.6192$ | | | |
| | $d_{13} = 0.1000$ | | |
| $r_{14} = 26.6609$ | | | |
| | $d_{14} = 4.0000$ | $n_7 = 1.59047$ | $\nu_7 = 53.20$ |
| $r_{15} = -27.7217$ | | | |
| | $d_{15} = 1.1500$ | | |
| $r_{16} = -20.0698$ | | | |
| | $d_{16} = 1.6200$ | $n_8 = 1.74332$ | $\nu_8 = 28.29$ |
| $r_{17} = 28.4569$ | | | |
| | $d_{17} = 2.3700$ | | |
| $r_{18} = 49.8487$ | | | |
| | $d_{18} = 3.2850$ | $n_9 = 1.56989$ | $\nu_9 = 63.16$ |
| $r_{19} = -19.9741$ | | | |

-continued

| f = 39.4–101.0, F/4.62–F/6.38 |
| 2ω = 57.6°–24.2° |

| | | | |
|---|---|---|---|
| $r_{20} = -32.3382$ | $d_{19} = D_2$ (variable) | | |
| | $d_{20} = 3.2970$ | $n_{10} = 1.78859$ | $\nu_{10} = 25.68$ |
| $r_{21} = -18.0269$ | | | |
| | $d_{21} = 1.5068$ | | |
| $r_{22} = -17.1137$ | | | |
| | $d_{22} = 1.6000$ | $n_{11} = 1.77450$ | $\nu_{11} = 49.66$ |
| $r_{23} = 125.4252$ | | | |

| f | 39.4 | 63.3 | 101.0 |
|---|---|---|---|
| $D_1$ | 3.616 | 11.470 | 16.524 |
| $D_2$ | 18.091 | 9.229 | 2.637 |

The Embodiment 1 has the composition illustrated in FIG. 2, and consists of a first lens group I having positive refractive power, a second lens group II having positive refractive power and a third lens group III having negative refractive power. This zoom lens system can be regarded as a lens system wherein the second lens group having positive refractive power and the third lens group having negative refractive power compose a single zoom lens system, and the first lens group having positive refractive power is arranged on the object side for enhancing vari-focal ratio. When the second lens group is shifted as the focusing lens group in the Embodiment 1, the first zoom airspace (the airspace reserved between the first lens group I and the second lens group II) and the second zoom airspace (the airspace reserved between the second lens group II and the third lens group III) are varied so as to produce a tendency to cancel the deviation of the image position on the imaging plane. This tendency is kept constant over the entire zooming range from the wide position to the tele position.

In the Embodiment 1, the first lens group I has a focal length $f_1$ of 69.56 mm, the second lens group II has a focal length $f_2$ of 30.98 mm and the third lens group III has a focal length $f_3$ of −32.36 mm. The second lens group selected as the focusing lens group has the shortest focal length and positive refractive power, and shift distance $\Delta x$ for focusing at an object distance of 1.5 m is 0.72 mm at the wide position, 0.95 mm at the intermediate focal length and 1.18 mm at the tele position.

Since the shift distance for focusing is short and varied relatively little depending on variation of focal length as described above, the Embodiment 1 is very effective for obtaining adaptability to the automatic focusing. Further, as compared with the focusing by shifting the first lens group, the focusing by shifting the second lens group makes it possible to shorten the minimum object distance allowed by a lens system and is advantageous from the viewpoint of reduction of the marginal light quantity.

Aberration characteristics at the wide position, intermediate focal length and tele position of the Embodiment 1 for infinite object distance, and those in the same conditions and for an object distance of 1.5 m are illustrated in FIG. 6 through FIG. 8 and FIG. 9 through FIG. 11 respectively. As in seen from the aberration characteristics illustrated in these drawings, spherical aberration and astigmatism are a little overcorrected at the tele position, and aberrations are varied very little due to focusing. From a viewpoint of mechanical structure, the second lens group comprises a shutter mechanism and must not be made eccentric with high precision during focusing.

Figure 3A:
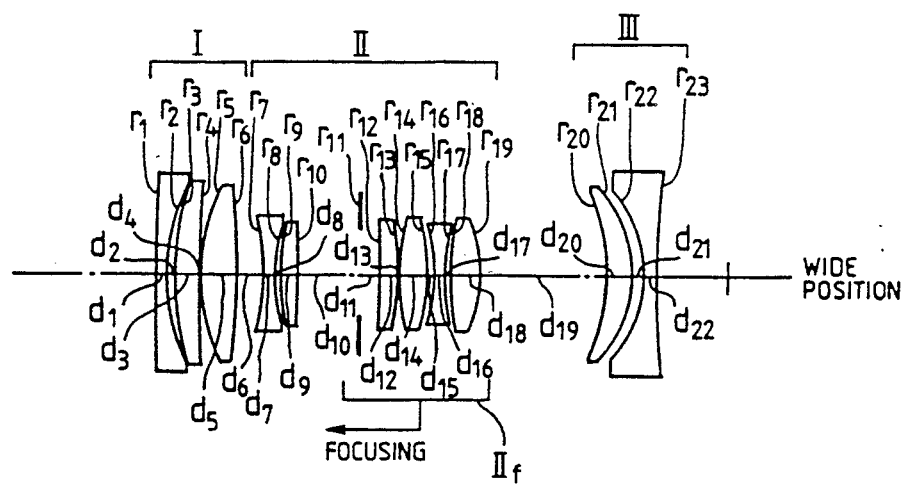
Figure 3B:
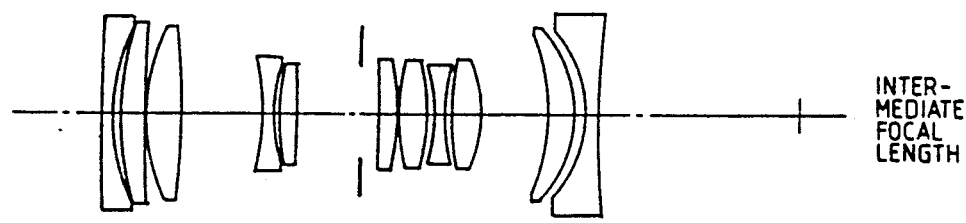
Figure 3C:
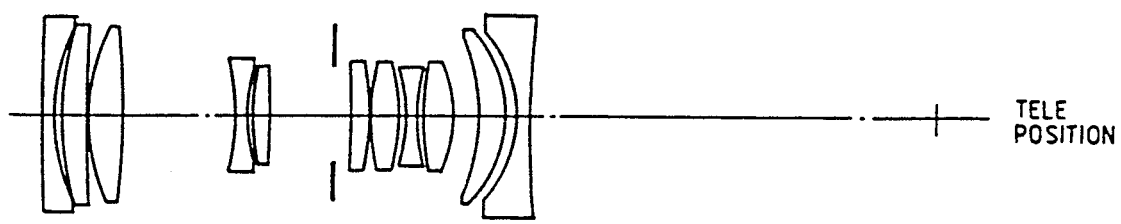

The Embodiment 2 of the present invention is a zoom lens system having the composition shown in FIG. 3 and designed with the following numerical data:

| f = 39.5–101.0, F/4.66–F/6.45 |
| 2ω = 57.4°–24.2° |

| | | | |
|---|---|---|---|
| $r_1 = 415.3053$ | | | |
| | $d_1 = 1.6500$ | $n_1 = 1.83400$ | $\nu_1 = 37.16$ |
| $r_2 = 29.3553$ | | | |
| | $d_2 = 1.1000$ | | |
| $r_3 = 38.9038$ | | | |
| | $d_3 = 3.4800$ | $n_2 = 1.60311$ | $\nu_2 = 60.70$ |
| $r_4 = 208.7133$ | | | |
| | $d_4 = 0.2000$ | | |
| $r_5 = 27.1440$ | | | |
| | $d_5 = 5.1985$ | $n_3 = 1.55963$ | $\nu_3 = 61.17$ |
| $r_6 = -94.8389$ | | | |
| | $d_6 = D_1$ (variable) | | |
| $r_7 = -33.8343$ | | | |
| | $d_7 = 1.6000$ | $n_4 = 1.77250$ | $\nu_4 = 49.66$ |
| $r_8 = 21.9940$ | | | |
| | $d_8 = 0.7600$ | | |
| $r_9 = 28.9672$ | | | |
| | $d_9 = 2.5100$ | $n_5 = 1.80518$ | $\nu_5 = 25.43$ |
| $r_{10} = -216.4230$ | | | |
| | $d_{10} = 8.2083$ | | |
| $r_{11} = \infty$(stop) | | | |
| | $d_{11} = 3.4987$ | | |
| $r_{12} = -264.1953$ | | | |
| | $d_{12} = 2.7640$ | $n_6 = 1.64769$ | $\nu_6 = 33.80$ |
| $r_{13} = -37.3840$ | | | |
| | $d_{13} = 0.3000$ | | |
| $r_{14} = 33.3986$ | | | |
| | $d_{14} = 3.9262$ | $n_7 = 1.61484$ | $\nu_7 = 51.17$ |
| $r_{15} = -29.0540$ | | | |
| | $d_{15} = 1.0600$ | | |
| $r_{16} = -21.2987$ | | | |
| | $d_{16} = 1.5390$ | $n_8 = 1.74000$ | $\nu_8 = 28.29$ |
| $r_{17} = 28.9445$ | | | |
| | $d_{17} = 0.8573$ | | |
| $r_{18} = 41.9368$ | | | |
| | $d_{18} = 4.2286$ | $n_9 = 1.60311$ | $\nu_9 = 60.70$ |
| $r_{19} = -20.4237$ | | | |
| | $d_{19} = D_2$ (variable) | | |
| $r_{20} = -29.3671$ | | | |
| | $d_{20} = 3.9353$ | $n_{10} = 1.78470$ | $\nu_{10} = 26.22$ |
| $r_{21} = -17.6703$ | | | |
| | $d_{21} = 1.6505$ | | |
| $r_{22} = -16.9018$ | | | |
| | $d_{22} = 1.7821$ | $n_{11} = 1.77250$ | $\nu_{11} = 49.66$ |
| $r_{23} = 150.1884$ | | | |

| f | 39.5 | 63.4 | 101.0 |
|---|---|---|---|
| $D_1$ | 3.668 | 11.581 | 16.102 |
| $D_2$ | 18.236 | 9.829 | 3.607 |

In the Embodiment 2, the three lens groups have focal lengths $f_1 = 70.0$ mm, $f_2 = 30.87$ mm and $f_3 = -31.28$ mm respectively, and the focusing lens group is designed as a lens group $II_r$ having positive refractive power which is arranged after a stop in the second lens group II and has a focal length on the order of 27 mm. In this embodiment, the focusing lens group is shifted toward the object side, $\Delta x$ being 0.65 mm at the wide position for an object distance of 1.5 m, 0.79 mm at the intermediate focal length, 0.91 mm at the tele position and suited for accelerating focusing speed.

Aberration characteristics of the Embodiment 2 at the wide position, intermediate focal length and tele position for infinite object distance and the abovementioned object distance are illustrated in FIG. 12 through FIG. 14 and FIG. 15 through FIG. 17 respectively. As is seen from these drawings, aberrations are highly stabilized in spite of focusing but the offaxial image plane is a little deviated toward the object side. However, aberrations are corrected favorably as a whole. As is judged from the tendency of the aberration described above, it is preferable to perform strict management so as to keep the specified paraxial spaces for the air lenses and no eccentricity the airspace in which the stop is arranged so as to prevent the stability from being lowered at the marginal portion due to eccentricity produced after assembly in a lens barrel.

Figure 4A:
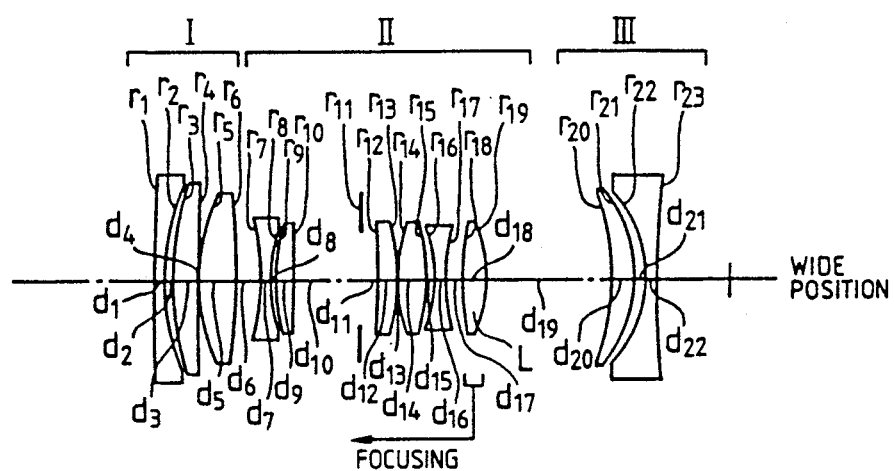
Figure 4B:
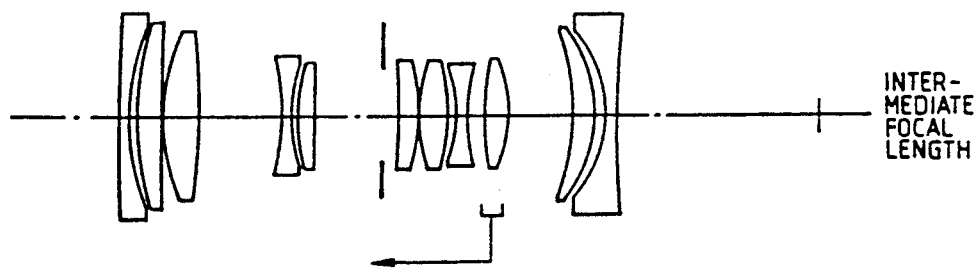
Figure 4C:
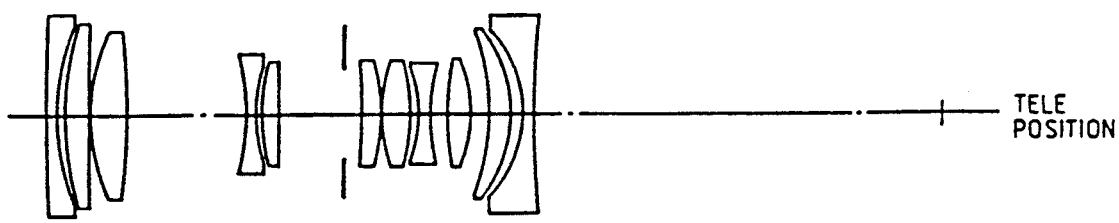

The Embodiment 3 of the present invention has the composition shown in FIG. 4 and the following numeral data:

| f = 39.4–101.0, F/4.63–F/6.3 |
| 2ω = 57.6°–24.2° |

| | | | |
|---|---|---|---|
| $r_1 = 349.7088$ | | | |
| | $d_1 = 1.5000$ | $n_1 = 1.83400$ | $\nu_1 = 37.16$ |
| $r_2 = 32.7103$ | | | |
| | $d_2 = 1.1000$ | | |
| $r_3 = 43.0934$ | | | |
| | $d_3 = 3.4800$ | $n_2 = 1.61700$ | $\nu_2 = 62.79$ |
| $r_4 = 418.8029$ | | | |
| | $d_4 = 0.2000$ | | |
| $r_5 = 27.6719$ | | | |
| | $d_5 = 5.2000$ | $n_3 = 1.51633$ | $\nu_3 = 64.15$ |
| $r_6 = -102.5407$ | | | |
| | $d_6 = D_1$ (variable) | | |
| $r_7 = -33.4624$ | | | |
| | $d_7 = 1.3000$ | $n_4 = 1.77250$ | $\nu_4 = 49.66$ |
| $r_8 = 21.4785$ | | | |
| | $d_8 = 0.8000$ | | |
| $r_9 = 25.8782$ | | | |
| | $d_9 = 2.5100$ | $n_5 = 1.80518$ | $\nu_5 = 25.43$ |
| $r_{10} = 12638.3302$ | | | |
| | $d_{10} = 8.2359$ | | |
| $r_{11} = \infty$ (stop) | | | |
| | $d_{11} = 3.5000$ | | |
| $r_{12} = -155.2002$ | | | |
| | $d_{12} = 2.8000$ | $n_6 = 1.62004$ | $\nu_6 = 36.25$ |
| $r_{13} = -30.4655$ | | | |
| | $d_{13} = 0.1000$ | | |
| $r_{14} = 26.1095$ | | | |
| | $d_{14} = 4.0000$ | $n_7 = 1.58904$ | $\nu_7 = 53.20$ |
| $r_{15} = -27.6198$ | | | |
| | $d_{15} = 1.1500$ | | |
| $r_{16} = -20.2113$ | | | |
| | $d_{16} = 1.6200$ | $n_8 = 1.74000$ | $\nu_8 = 28.29$ |
| $r_{17} = 29.0662$ | | | |
| | $d_{17} = 2.3700$ | | |
| $r_{18} = 50.8321$ | | | |
| | $d_{18} = 3.2850$ | $n_9 = 1.56873$ | $\nu_9 = 63.16$ |
| $r_{19} = -20.3481$ | | | |
| | $d_{19} = D_2$ (variable) | | |
| $r_{20} = -32.1896$ | | | |
| | $d_{20} = 3.2970$ | $n_{10} = 1.78472$ | $\nu_{10} = 25.68$ |
| $r_{21} = -17.9630$ | | | |
| | $d_{21} = 1.5068$ | | |
| $r_{22} = -17.0004$ | | | |
| | $d_{22} = 1.6000$ | $n_{11} = 1.77250$ | $\nu_{11} = 49.66$ |
| $r_{23} = 125.4220$ | | | |

| f | 39.4 | 63.4 | 101.0 |
|---|---|---|---|
| $D_1$ | 3.466 | 11.616 | 16.508 |
| $D_2$ | 18.023 | 9.229 | 2.637 |

The Embodiment 3 is so designed as to perform focusing by using a single, light-weight lens component arranged in the second lens group, and has a merit to permit obtaining high precision for the shifting and positioning of the focusing lens component with a driving system.

The three lens groups have focal length of $f_1 = 68.41$ mm, $f_2 = 30.91$ mm and $f_3 = -32.12$ mm respectively, and the focusing lens L is a biconvex lens component having the eighteenth surface ($r_{18}$), the nineteenth surface ($r_{19}$) and a focal length on the order of 28.0 mm. $\Delta x$ required for focusing to an object distance of 1.5 m is 0.62 mm at the wide position, 0.78 mm at the intermediate focal length and 0.92 mm at the tele position.

Aberration characteristics at the wide position, intermediate focal length and tele position of the Embodiment 3 for infinite object distance and the abovementioned object distance are illustrated in FIG. 18 through FIG. 20 and FIG. 21 through FIG. 23 respectively. This embodiment overcorrects spherical aberration a little at the tele position but keeps it within a range sufficient for practical use, and permits focusing at high speed.

Figure 5A:
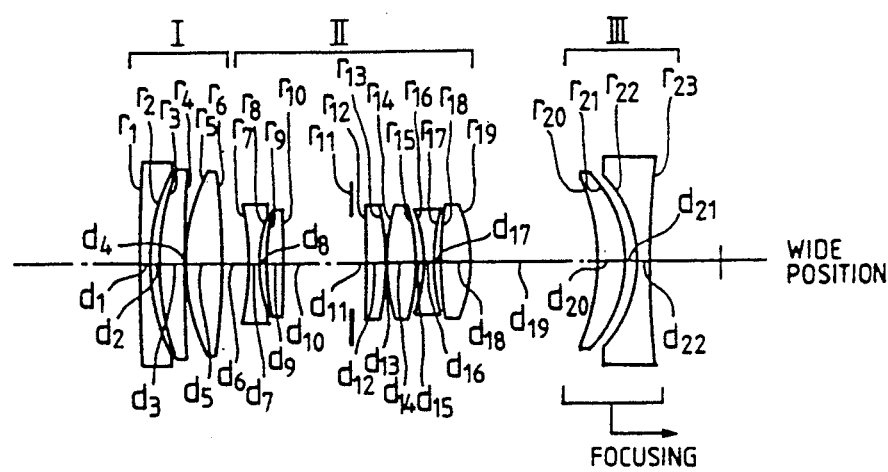
Figure 5B:
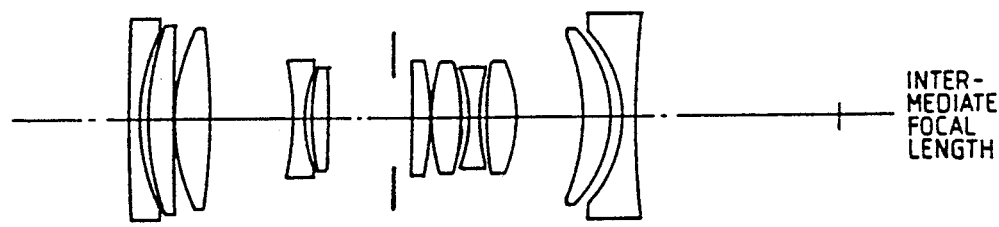
Figure 5C:
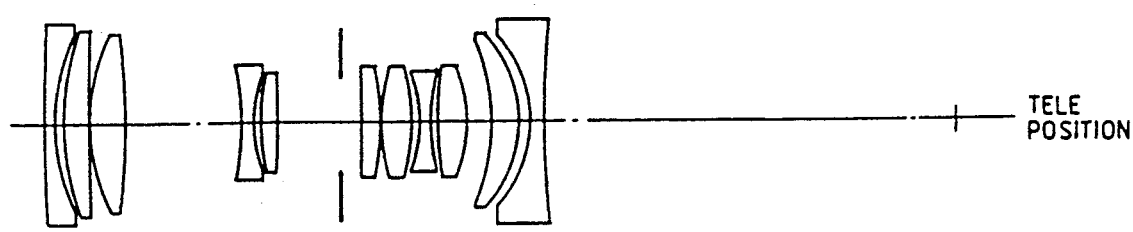
Figure 8:
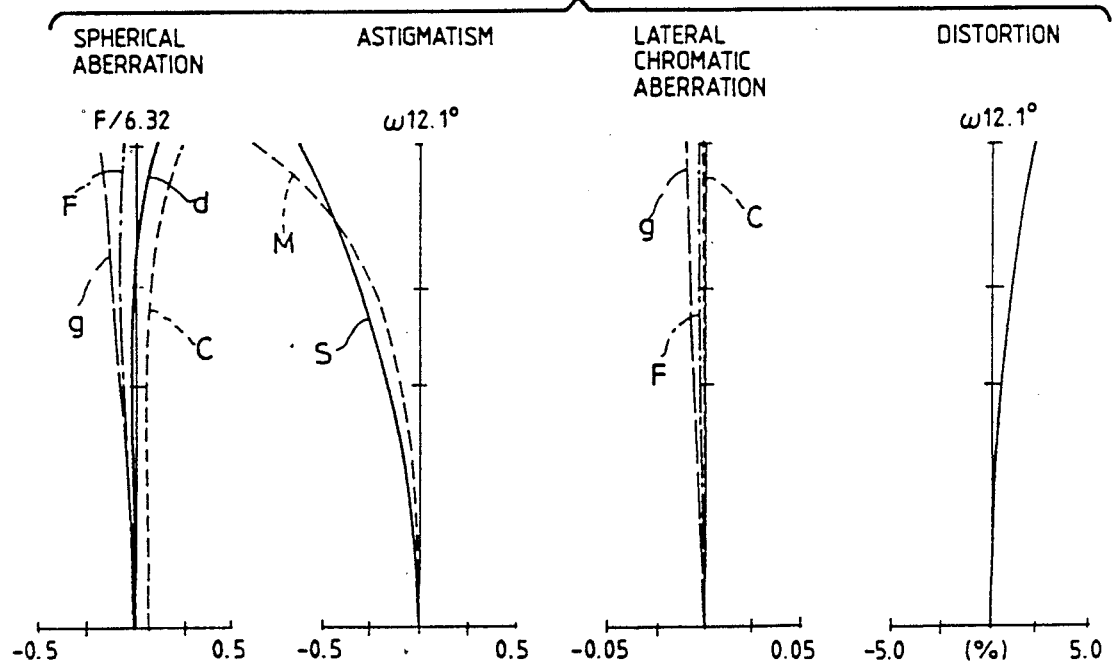
Figure 9:
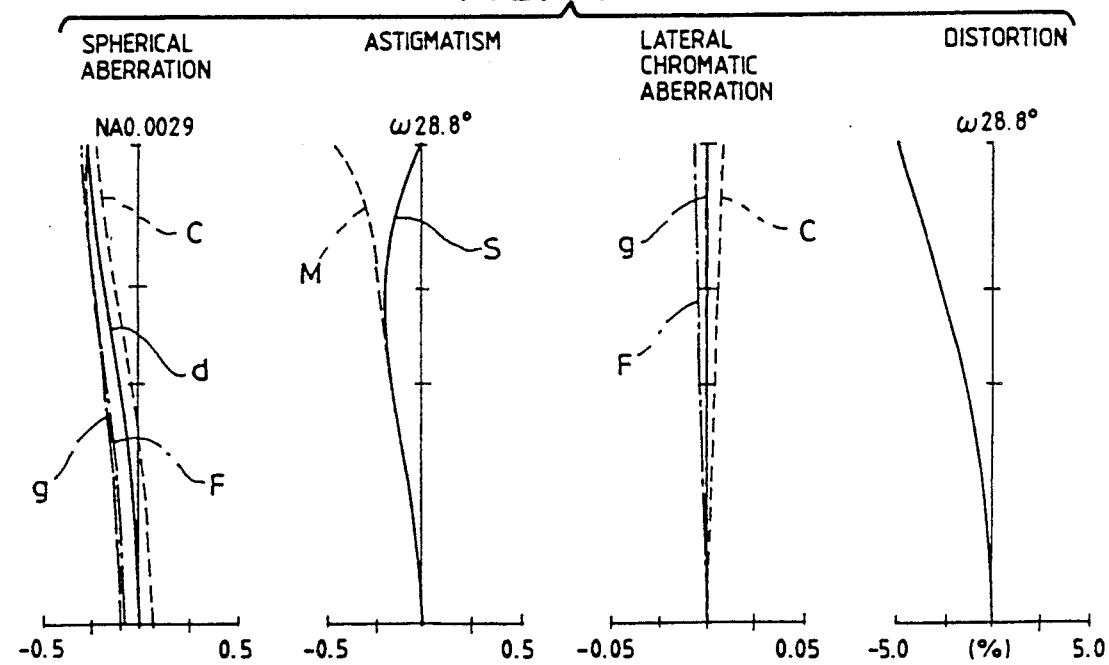
Figure 14:
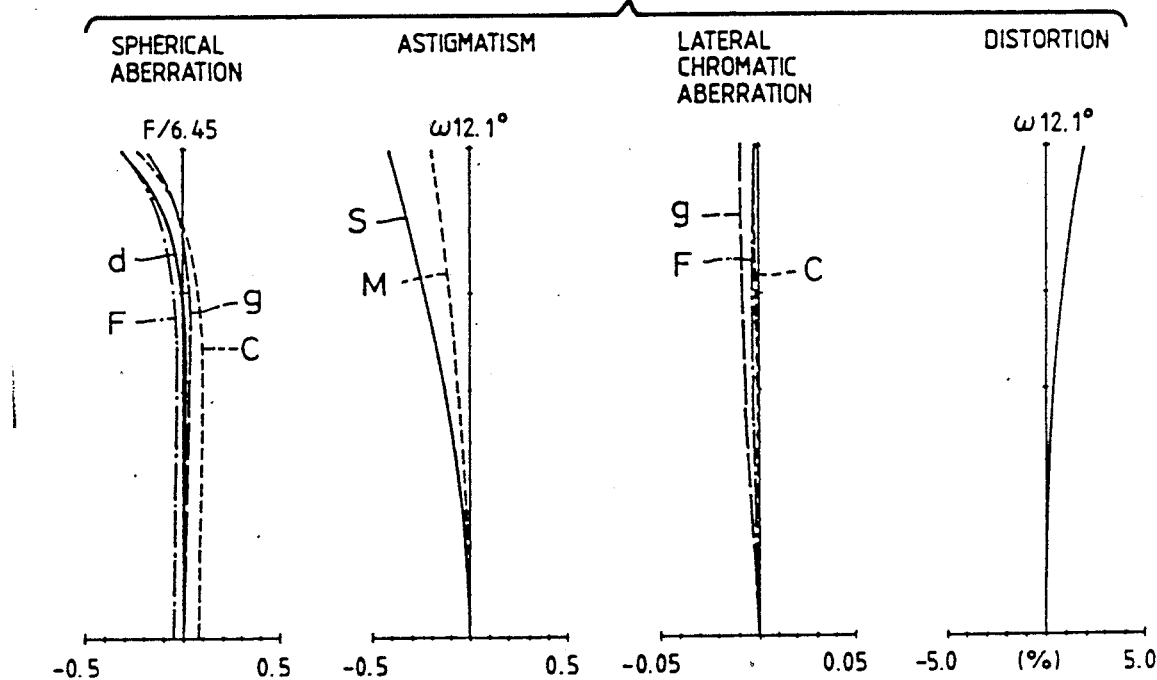
Figure 15:
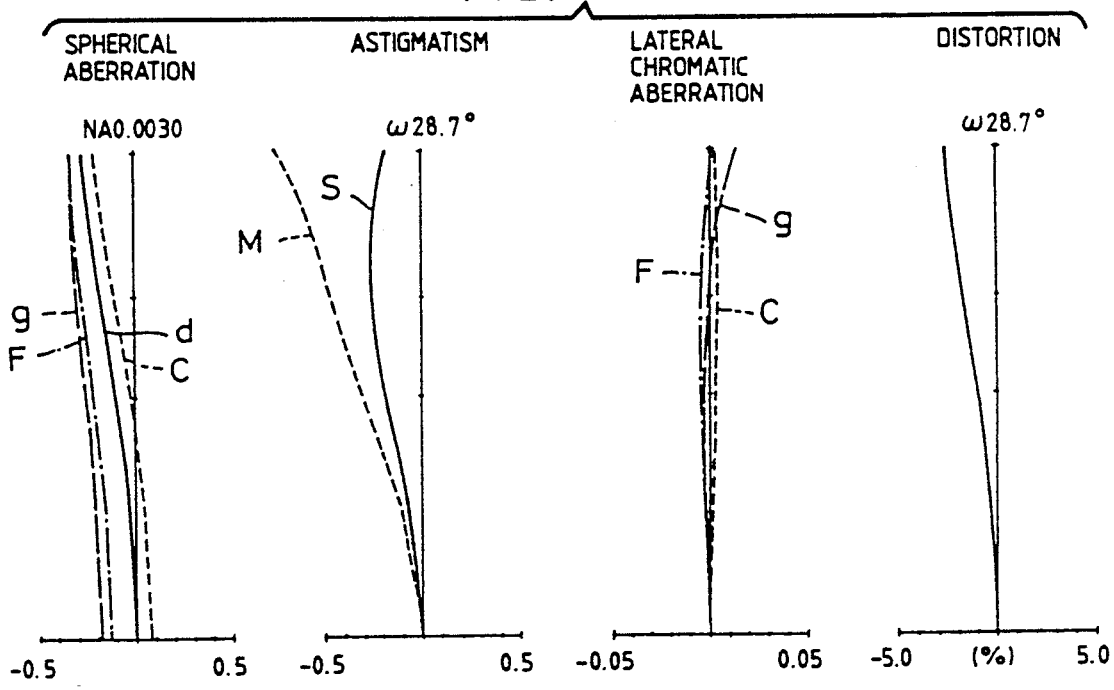
Figure 16:
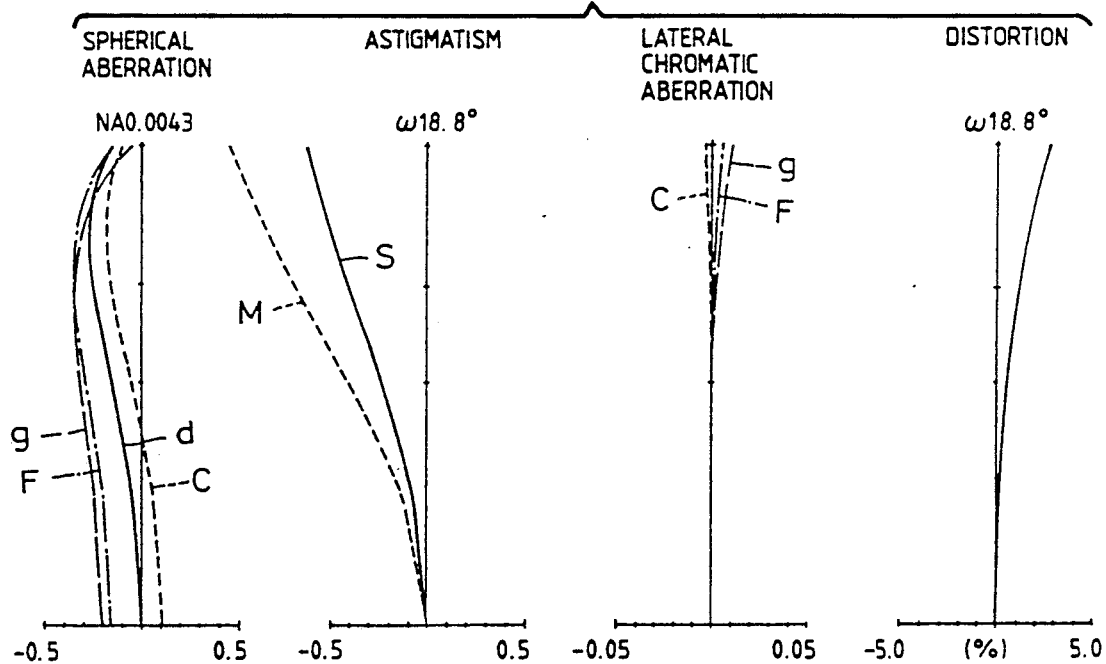
Figure 17:
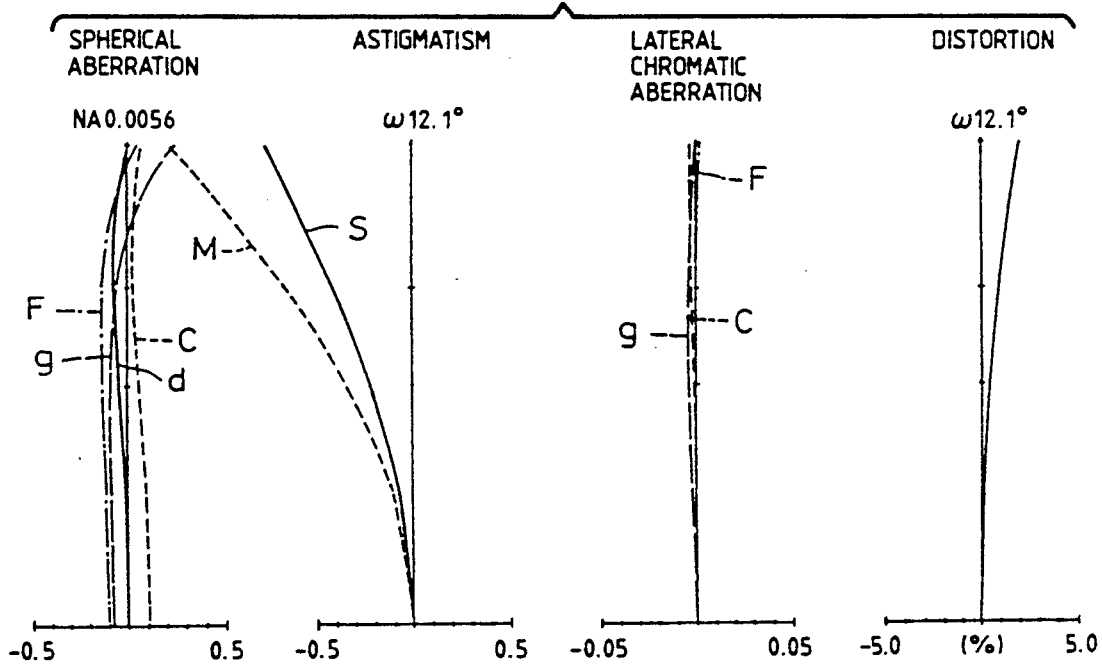
Figure 22:
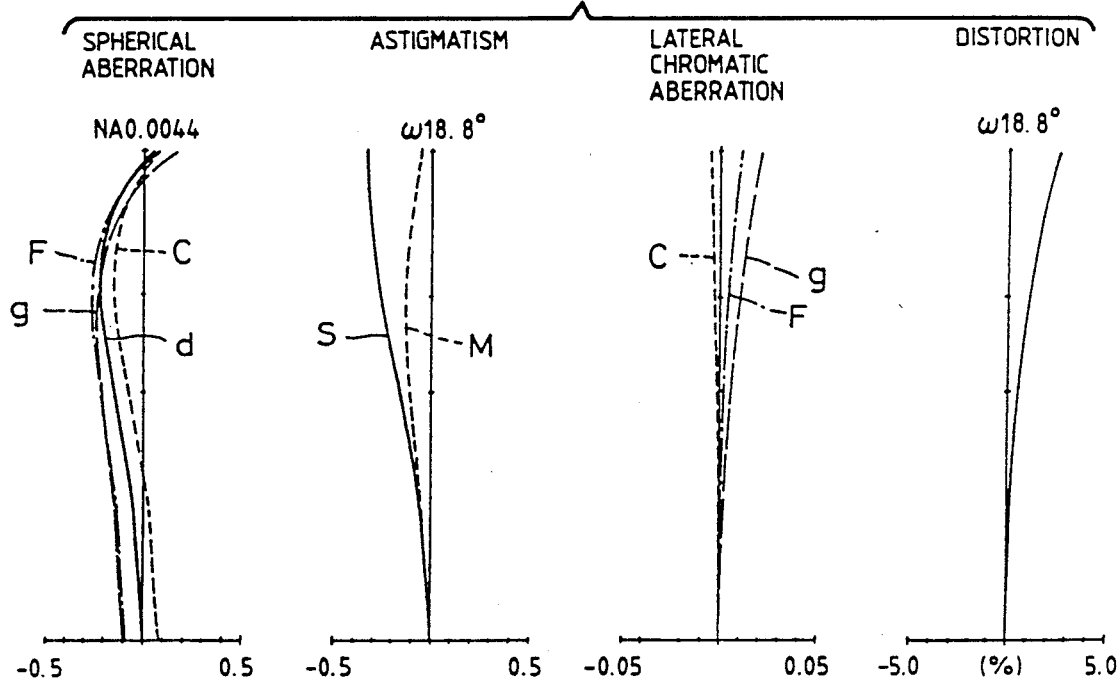
Figure 23:
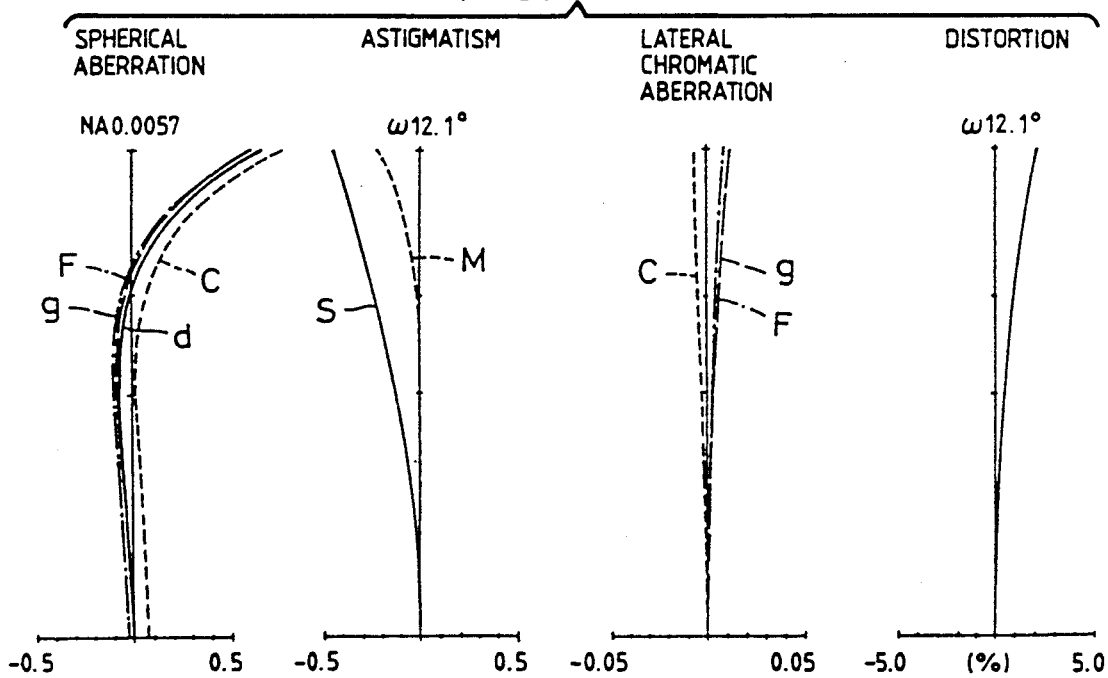
Figure 28:
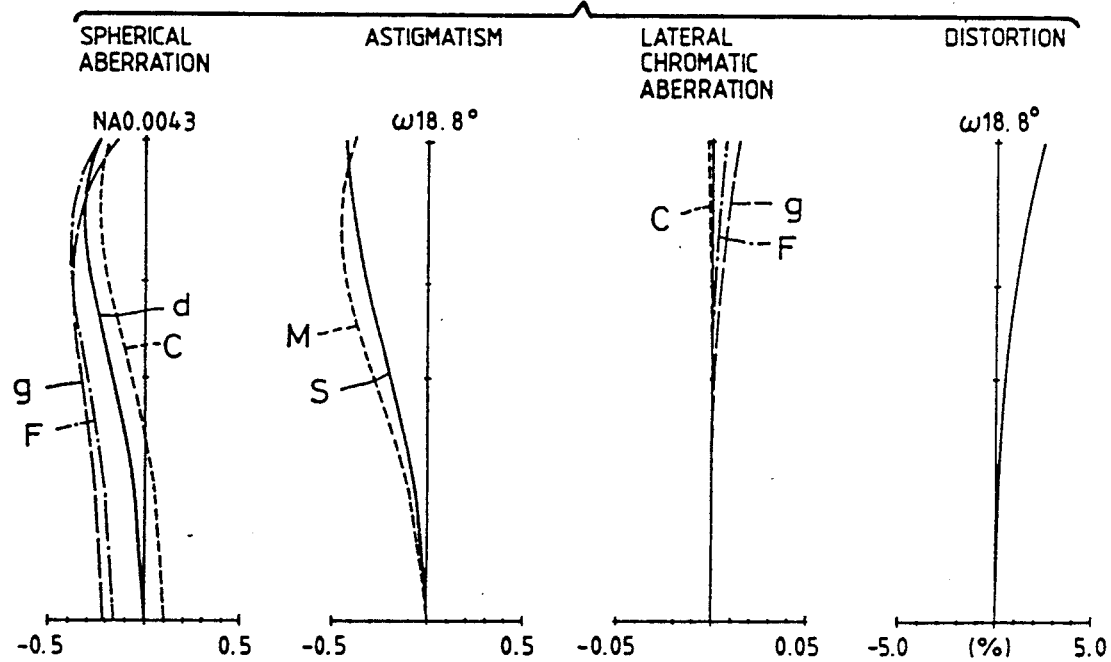
Figure 29:
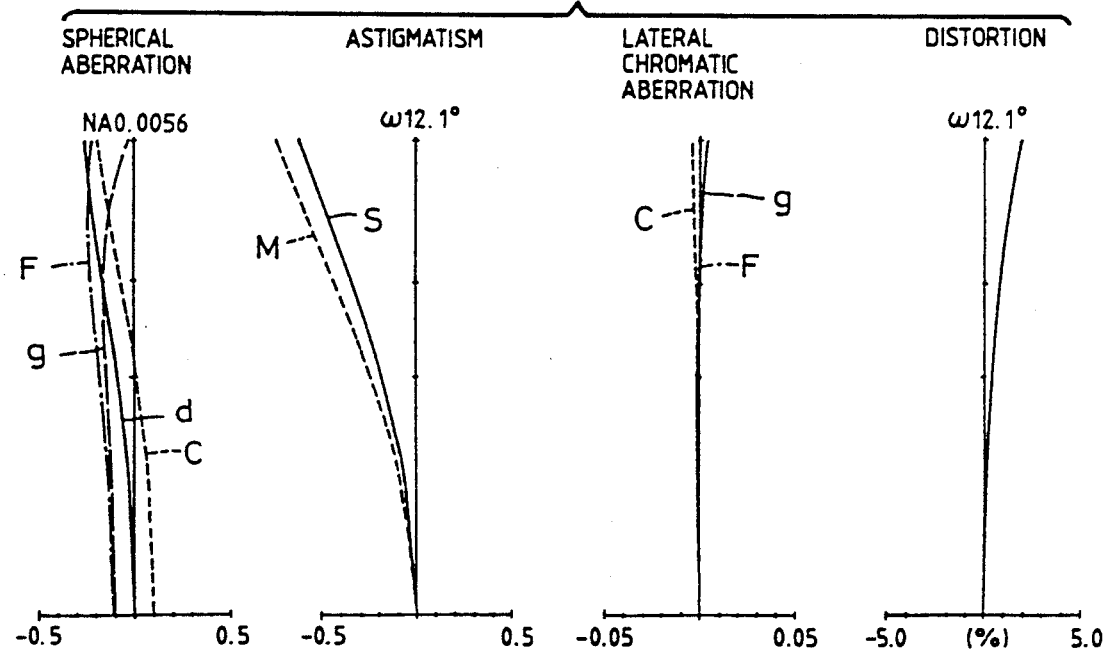

The Embodiment 4 of the present invention is a zoom lens system having the composition shown in FIG. 5 and the following numerical data:

| f = 39.5–101.0, F/4.66–F/6.38 |
| 2ω = 57.4°–24.2° |

| | | | |
|---|---|---|---|
| $r_1 = 414.8764$ | | | |
| | $d_1 = 1.5161$ | $n_1 = 1.83400$ | $\nu_1 = 37.16$ |
| $r_2 = 29.4481$ | | | |
| | $d_2 = 1.1001$ | | |
| $r_3 = 37.6915$ | | | |
| | $d_3 = 3.4800$ | $n_2 = 1.61700$ | $\nu_2 = 62.79$ |
| $r_4 = 212.2179$ | | | |
| | $d_4 = 0.2007$ | | |
| $r_5 = 27.1089$ | | | |
| | $d_5 = 5.1997$ | $n_3 = 1.53996$ | $\nu_3 = 59.57$ |
| $r_6 = -96.7632$ | | | |
| | $d_6 = D_1$ (variable) | | |
| $r_7 = -34.3526$ | | | |
| | $d_7 = 1.6008$ | $n_4 = 1.77250$ | $\nu_4 = 49.66$ |
| $r_8 = 22.0426$ | | | |
| | $d_8 = 0.7742$ | | |
| $r_9 = 30.0957$ | | | |
| | $d_9 = 2.5102$ | $n_5 = 1.80518$ | $\nu_5 = 25.43$ |
| $r_{10} = -191.1137$ | | | |
| | $d_{10} = 8.2165$ | | |
| $r_{11} = \infty$ (stop) | | | |
| | $d_{11} = 3.4924$ | | |
| $r_{12} = -207.6710$ | | | |
| | $d_{12} = 2.7728$ | $n_6 = 1.64769$ | $\nu_6 = 33.80$ |
| $r_{13} = -36.4365$ | | | |
| | $d_{13} = 0.3002$ | | |
| $r_{14} = 32.2618$ | | | |
| | $d_{14} = 4.0186$ | $n_7 = 1.61484$ | $\nu_7 = 51.17$ |
| $r_{15} = -28.6180$ | | | |
| | $d_{15} = 1.0850$ | | |
| $r_{16} = -21.3225$ | | | |
| | $d_{16} = 1.5474$ | $n_8 = 1.74000$ | $\nu_8 = 28.29$ |
| $r_{17} = 28.9181$ | | | |
| | $d_{17} = 0.8487$ | | |
| $r_{18} = 42.6353$ | | | |
| | $d_{18} = 4.2202$ | $n_9 = 1.60311$ | $\nu_9 = 60.70$ |
| $r_{19} = -20.5612$ | | | |
| | $d_{19} = D_2$ (variable) | | |
| $r_{20} = -29.2738$ | | | |
| | $d_{20} = 3.9408$ | $n_{10} = 1.78470$ | $\nu_{10} = 26.22$ |
| $r_{21} = -17.6023$ | | | |
| | $d_{21} = 1.6425$ | | |
| $r_{22} = -16.8277$ | | | |
| | $d_{22} = 1.7892$ | $n_{11} = 1.77250$ | $\nu_{11} = 49.66$ |
| $r_{23} = 141.0844$ | | | |

| f | 39.49 | 63.4 | 101.0 |
|---|---|---|---|
| $D_1$ | 3.732 | 11.529 | 16.237 |
| $D_2$ | 17.823 | 9.597 | 3.518 |

In the Embodiment 4, the third lens group is used as the focusing lens group, and the lens groups controllable directly from the camera body have focal lengths of $f_1 = 70.81$ mm, $f_2 = 30.42$ mm and $f_3 = -30.83$ mm respectively. For focusing the zoom lens system on an object located at a distance of 1.5 m, the third lens group is shifted toward the film surface for a distance $\Delta x$ of 1.251 mm at the wide position, 0.971 mm at the intermediate focal length and 0.958 mm at the tele position. It is therefore necessary to prevent the marginal ray from being eclipsed by the third lens group when it is shifted toward the film surface.

Aberration characteristics at the wide position, intermediate focal length and tele position of the Embodiment 4 for infinite object distance and an object distance of 1.5 m are illustrated in FIG. 24 through FIG. 26 and FIG. 27 through FIG. 29 respectively.

In the numerical data of the embodiments described above, the reference symbols $r_1, r_2, ...$ represent radii of curvature on the surfaces of the respective lens components, the reference symbols $d_1, d_2, ...$ designate thicknesses and airspaces reserved therebetween, the reference symbols $n_1, n_2, ...$ denote refractive indices of the respective lens components, the reference symbols $\nu_1, \nu_2, ...$ represent Abbe's number of the respective lens components, and the refrence symbol f designates focal length of the zoom lens system as a whole. Further, the reference symbols $D_1$ and $D_2$ represent widths of the variable airspaces at the three positions for zooming.

The zoom lens system according to the present invention can be focused by shifting for a very short distance a lens group which is other than the first lens group and has a small outside diameter, is suited as a compact lens system for cameras equipped with automatic focusing function, and can be focused on an object located at short distance.

I claim:

1. A zoom lens system of inner focus type comprising, in the order from the object side, a first lens group positive refractive power arranged at the objectmost side, a second lens group having positive refractive power and disposed adjacent to said first lens group with no intervening lens group therebetween, and a third lens group having negative refractive power and disposed adjacent to said second lens group with no intervening lens group therebetween, the system being so configured as to perform variation of focal length by varying airspaces reserved between said first lens group and said second lens group and between said second lens group and said third lens group, and so adapted as to perform focusing by shifting, along the optical axis, a lens group arranged on the image side of said first lens group.

2. A zoom lens system of inner focus type according to claim 1 wherein said lens group shifted along the optical axis for focusing is the second lens group.

3. A zoom lens system of inner focus type according to claim 1 wherein the lens group shifted along the optical axis for focusing is the third lens group.

4. A zoom lens system of inner focus type according to claim 1 wherein said second lens group comprises a plural number of lens components and some of said lens components are shifted along the optical axis for focusing.

* * * * *